Nov. 8, 1960    R. M. RIGOT    2,959,204
THREADED FASTENER WITH BITING TEETH AND BEARING PLATFORM
Filed June 18, 1958
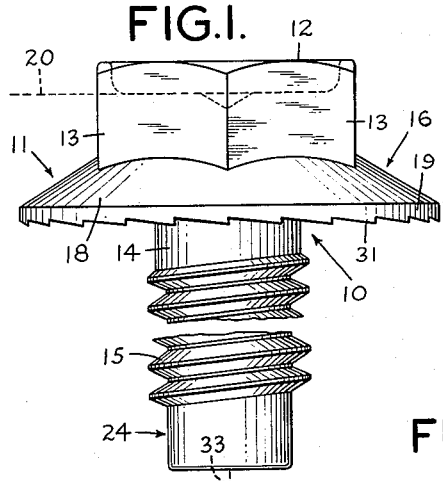
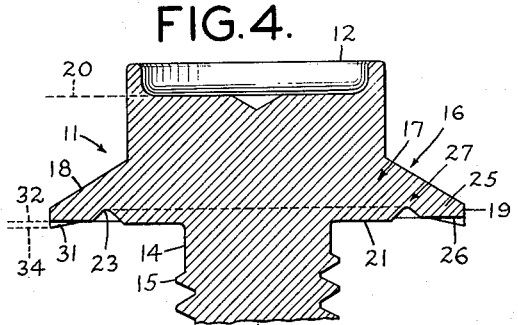
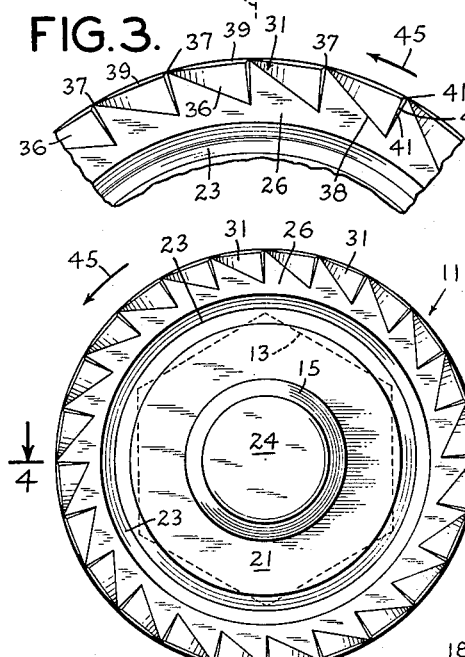
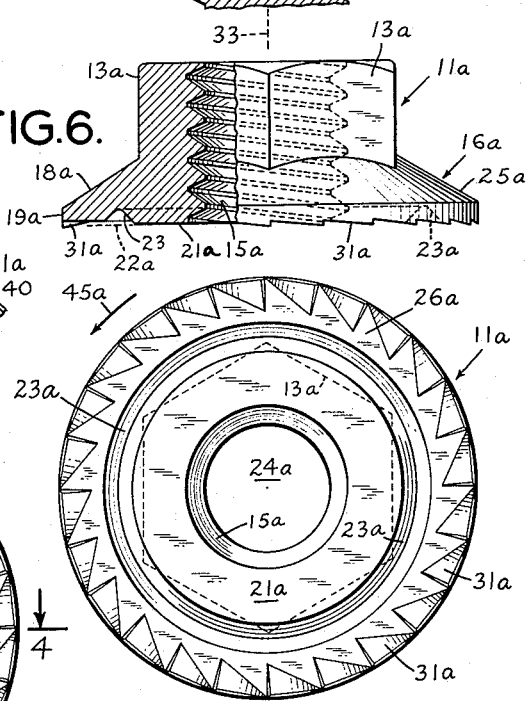
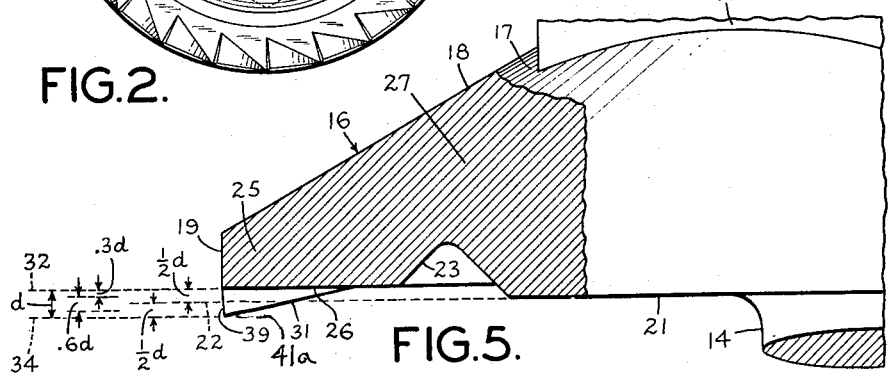

United States Patent Office 2,959,204
Patented Nov. 8, 1960

2,959,204

THREADED FASTENER WITH BITING TEETH AND BEARING PLATFORM

Robert M. Rigot, Port Chester, N.Y., assignor to Russell, Burdsall & Ward Bolt and Nut Company, Port Chester, N.Y., a corporation of New York Filed June 18, 1958, Ser. No. 742,851

5 Claims. (Cl. 151—37)

This invention relates to lock nuts and bolts and more particularly to locking means that may be applied to the head of a bolt or screw or to a nut for the purpose of preventing the nut, bolt or screw from becoming unintentionally loosened in use after it has been tightened in its plane.

Although the invention is applicable to a nut or to a bolt having a head or screw having a head, it will, for convenience, be described in connection with a bolt. But, in so describing the invention it will be understood that the invention is applicable to any of these threaded fastening devices.

Considering the present day requirements for best meeting the needs of fastening devices, such as locking bolts, used for fastening metal parts together in modern machinery and equipment and especially parts of machines, equipment or the like which are subject to movement or vibration or other forces which may tend to cause unwanted loosening of the bolts after they have been tightened or "driven home," it is desirable that the bolt when driven home by turning it with a wrench or other suitable tool will hold the parts together with a relatively high clamping force. This clamping force is referred to or indicated in terms of "thread tension." In other words, it is desirable that the bolt not only be capable of exhibiting a very high thread tension or clamping force but also, it is desirable that an unduly large torque is not required to drive the bolt home to a given high thread tension. Moreover, it is desirable, when the bolt is driven home to such a given thread tension, that the bolt have locking characteristics which will prevent it from unwanted loosening which may be brought about by reason of vibration of the machine or the parts fastened together or by reason of other similar causes. In the parlance of the mechanic, it is desirable that a locking bolt (or screw or nut) require a substantially higher "off torque" to loosen the bolt (for removal) after it is driven home to a given thread tension than the "on torque" required to drive it home (tighten it) to that given thread tension. Not only should the lock bolt meet those requirements when used only once (driven home the first time) but the bolt should be capable of meeting those requirements after several re-uses. In other words, it is very often necessary or desirable, for purposes of repair or for other reasons, to remove a bolt after it has been tightened for the purpose of fastening parts together. That is, it may be necessary to remove a bolt after its initial or first use and use it over again for its intended purposes. The locking bolt should be capable of removal and re-use a plurality of times without substantial impairment of its initial desirable characteristics of substantially higher "off" torque than "on" torque for a given thread tension.

It is known, of course, that bolts hold parts together by exerting pressure on the mating surfaces. Needed pressure is developed by tightening the bolt. The force tending to clamp the parts together is referred to as thread tension and it is measured and indicated in terms of total pounds or equivalent units. The torque required to turn and tighten the bolt with a wrench (or other tool) to a given clamping force or thread tension (the "on" torque) is measured and indicated in terms of foot pounds or inch pounds (that is, length of the lever multiplied by units of force) and the torque required to loosen a theretofore tightened bolt to remove it (the "off" torque) is measured and indicated in terms of foot pounds or inch pounds.

One commercially successful bolt of the self-locking type with which my invention is concerned is shown in MacDonald United States Patent No. 2,253,241. The patented bolt of MacDonald can be made to have an "off torque" sufficiently higher than it has for a given "on torque," but at the same time its thread tension for that given "on torque" is relatively low. It will be understood by those skilled in the art that in modern practice a given "on torque" is specified which will be within the limits of the strength of the bolt so that in screwing the bolt home a force high enough to cause failure of the material will not be exerted on the bolt. Thus, for example, a bolt made according to the above-mentioned MacDonald patent having a ⅜" diameter shank, one inch long and having 24 threads to the inch, if screwed home into a plate on a standard testing machine at an "on torque" of 360 inch pounds, will have a thread tension of about 1800 to 2000 pounds and an "off torque" of 440 to 460 inch pounds.

In another bolt of the general type to which my invention relates, an annular flange is provided which extends laterally from the head of the bolt, there being a series of circumferential spaced teeth extending downwardly from the bottom surface of the annular flange. There is an annular bearing surface under the head around the shank of the bolt in the same plane as the plane of the bottom side of the flange. And there is an annular groove in the bottom of the flange positioned inwardly of said annular row of teeth and outwardly of said annular bearing surface; the groove providing a flexibility to the flange so that it is flexed upwardly and placed under tension when the bolt is screwed home into a metal part which is to be fastened. This arrangement is an improvement over the prior MacDonald patented bolt, in that for a given "on torque" the thread tension and "off torque" are greater than is obtained with the MacDonald bolt of the same size.

My invention provides threaded fastening devices, such as bolts, screws and nuts having the desirable characteristics mentioned above and is an improvement on these prior so-called self-locking fasteners (bolts, nuts and screws). According to my invention a fastener of this type may be provided which has a substantially higher "off torque" than "on torque" when the fastener is screwed home and furthermore will have a substantially higher thread tension when screwed home with a given "on torque" than prior fasteners of this general type. The head of my fastening device (if it be a threaded bolt or screw) or a nut (if it be internally threaded to be screwed onto a threaded male member) is provided with an annular peripheral flange extending laterally from the lower end of the head portion of the fastener. The laterally extending annular flange is thicker at the place where it joins the head portion and its top wall tapers downwardly and outwardly to a comparatively thin edge portion. The bottom surface of the flange lies in a different plane from that in which the area under the head lies; this latter area being herein referred to as the annular bearing area or surface. The bottom surface of both the flange and the annular bearing area under the head lie in planes at substantially right angles to the axis of the threaded part of the fastener. The lower surface of the flange at its periphery is provided with a row of circumferentially spaced downwardly protruding teeth, the lower edges or sharp points of which lie in a plane below a plane through the annular bearing surface around the shank under the head (if it be a bolt) and around the bore underneath the head portion of the nut (if it be a nut). It is significant to note here, however, that the roots of the teeth at the annular surface of the bottom side of the flange lie in a plane higher than the plane of the annular bearing surface. An annular groove in the underface of the flange and inwardly and concentric with the row of locking teeth is provided to relieve or make the metal thinner inwardly of the teeth, so that when the fastener is driven home, the peripheral portion of the flange is flexed upwardly to place the outer portion of the flange under tension. I have found that by providing inwardly of the groove an annular bearing surface which lies below the plane of the bottom of the annular flange by a distance within the range of about three-tenths to six-tenths, and preferably approximately one-half, of the depth of the teeth, that the thread tension for a given "on torque," and therefore the clamping force, may be materially increased while still retaining the desirable characteristics of higher "off torque" than "on torque."

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 1 is a view in elevation of a bolt embodying the invention;

Fig. 2 is a plan view of the bolt shown in Fig. 1 looking toward the under side of the head;

Fig. 3 is a partial view to larger scale to show the locking teeth as in Fig. 2 looking toward the under side of the head;

Fig. 4 is a view in cross-section of the head and upper end of the threaded shank on line 4—4 of Fig. 2;

Fig. 5 is a partial view in section to larger scale showing the peripheral flange, the groove, the teeth and the annular bearing surface surrounding the shank;

Fig. 6 is a view in elevation of a nut, having a threaded bore, embodying the invention; and Fig. 7 is a plan view of the nut shown in Fig. 6, looking toward the bottom of the nut.

Referring to Figs. 1 to 5 in the drawings, the bolt 10 has a head 11 which may be hexagonal as shown or of any other desired shape. For purposes of description the top or crown of the head is designated 12 and the sides of the hex head are designated 13. The bolt is provided with the usual cylindrical portion or stem 24 comprising shank 14 having a threaded portion 15. Extending outwardly and laterally from the lower end portion of the head 11 is an annular peripheral flange 16 which, as shown, is thicker at its inner annular portion 17. The upper side 18 of the flange gradually tapers downwardly to a thinner peripheral edge 19. For convenience of description and to establish planes of reference, a plane 20 through the crown 12 of the head may be considered as lying in a horizontal plane and the flange 16 as lying below said plane. Plane 20 may be taken as a plane of reference and is referred to as such later on.

The annular face 21 under the bolt head is smooth and flat and this flat surface extends outwardly forming what may be considered an annular bearing surface under the head; this annular area 21 serving as a bearing area when the bolt is screwed home. For convenience of description, this bearing area 21 may be referred to as a "bearing platform." It is significant to note, however, that an annular groove 23 is provided in the lower face 26 of the flange 16. This groove provides a relief or less thickness of metal at 27 which in turn provides a flexibility in the flange 16 so that the outer end or peripheral portion 25 may flex upwardly and be placed under tension when the bolt 10 is screwed or driven home into a threaded bore of a machine part or the like. However, the groove 23 is not made sufficiently wide or deep that the peripheral portion 25 is flexed upwardly beyond its elastic limit when the bolt is screwed home. As shown, the groove 23 tapers to make a V-groove of 90°.

Underneath the outer peripheral face portion 26 at the outer end of the flange and outwardly of the annular groove 23 is a circular row of downwardly protruding teeth 31. These teeth extend downwardly from the plane 32 of the annular face surface 26 of the flange. The annular bearing surface 21 may be considered as lying in the plane 22 below and parallel with plane 32 and at right angles to the axis 33 of the shank 14. And, as shown, the plane 22 of the surface 21 lies approximately midway between plane 32 in the surface 26 and plane 34 through the points 41a of the teeth 31. Hence, the depth $d$ of the teeth may be considered as the distance $d$ between the plane 32 and the plane 34 through the points 41a of the teeth; the roots of the teeth lying in the plane 32 which is through the lower annular surface 26 of the flange 16 outwardly of the groove 23. Although the preferred position of the annular bearing surface 21 is in a plane 22 which lies below the plane 32 a distance of approximately half the depth of the teeth 31, this bearing surface 21 may be raised or lowered within limits and still retain partial benefits of the invention. I have found that if the bearing surface 21 is raised (toward the plane 20 which is through the surface of the crown of the head) so that it lies below the plane 32 (through the roots of the teeth or surface 26) by a distance less than three-tenths of the depth of the teeth 31, that the resultant bolt for a given on torque will have a sufficiently high off torque but will not have a desirable and sufficiently high thread tension which is characteristic of the bolts embodying my invention. And I have found that if the bearing surface 21 is lowered so that it lies in a plane below the plane 32 by a distance greater than six-tenths of the depth of the teeth 31, that the resultant bolt will have a sufficiently high thread tension for a given on torque but the off torque will not be materially higher than the on torque in which case the bolt would not have the desirable higher off torque which is characteristic of bolts embodying my invention.

The locking teeth may be of the shape illustrated in the drawings and perhaps best illustrated in Fig. 3, wherein is shown a partial view of the underside of the peripheral, flexible, annular flange portion 25 of the flange 16. As shown, each of the locking teeth 31, has a tapered, triangular shaped, leading face 36 which extends from a leading point 37 at the peripheral edge 19 of the flange 16. This leading face 36 lies in a plane inclined downwardly from the annular bottom surface area 26 and rearwardly from its leading point 37, the edge 38 of the triangular shaped face 36 lying in the plane of said surface area 26. Each tooth 31 has a peripheral, substantially vertical, side wall 39 and a substantially vertical trailing wall 40. Leading face 36 and trailing wall 40 meet to form a trailing edge 41 and a sharp point or crest 41a, said points 41a lying below the plane 22 which is through the annular bearing surface area 21.

It will be seen that when the bolt is screwed home in the direction of arrow 45 into a machine part, or other part, the tapered surfaces 36 of the teeth 31 act as cam surfaces and will work edges 41 of the teeth 31 into the surface of the part into which the bolt is screwed. As the bolt is turned to screw it home, the lowest edges of the teeth first engage the surface of the part into which the bolt is being screwed. As the bolt is further turned on its axis 33 to tighten it, the outer peripheral portion 25 of the flange 16 is flexed upwardly. As the turning (to tighten) continues, more force is exerted by the teeth in a direction toward the part and then the bearing surface 21 engages the part. This bearing surface together with the teeth 31 continue to increase their friction on the part into which the bolt is being screwed. When the bolt is screwed home with a predetermined specified on torque, a desired and very high thread tension will result and the outer peripheral flange portion 25 will be flexed and placed under tension with the teeth gripping the part into which the bolt is screwed. It requires a certain torque, which is the tightening or "on" torque to screw the bolt home to a given desired thread tension. During this operation of driving the bolt home, there has been some frictional resistance to turning caused by engagement of the rigid annular face area 21 under the head of the bolt with the part into which the bolt is screwed but this results in the desired higher thread tension. A large part of the torque resistance (the frictional resistance to turning) during the first part of the operation is between the cam shaped locking teeth 31 and the part into which the bolt is screwed but these teeth may also move with the flexible outer, annular flange portion 25 of the flange 16. The result is that with the bearing surface 21 located midway of the depth of the teeth a very high thread tension may be placed on the bolt with less "on" torque than is the case with a bolt in which the area around the flange is flush with the bottom area of the flange. Also, the bolt, as shown and described, requires a significantly greater "off" torque to loosen the bolt after it is driven home to a given thread tension than the "on" torque to screw the bolt home to that thread tension. Inasmuch as the trailing walls 40 of the teeth are not inclined to form cam surfaces as faces 36, the sharp corners 41 of the teeth bite into the part into which the bolt is screwed when the bolt is turned in the opposite or loosening direction and offer more resistance to loosening. Consequently, the bolt, after it is screwed home, is highly resistant to unwanted loosening which might be caused by vibration, jarring, or other similar reason.

Not only will a bolt constructed in accordance with the invention require a significantly higher "off" torque than "on" torque for a given thread tension on its first use but the same bolt may be removed and used again many times and still retain substantially the same desirable "on" and "off" torque qualities as well as the same high thread tension characteristics as it had on its initial use.

It will be understood that there may be some range in the relative dimensions of the various parts of the bolt and such dimensions will be used as will obtain the desired relative characteristics. By way of specific example, a bolt having a 5/16" diameter stem, 24 threads per inch (5/16"—24 x 1) may have a hex head to fit a standard wrench, such as illustrated on the drawings. The flange portion may have a radial width of about 5/32" and a depth of about 1/8" where it joins with the side faces of the hex head; the depth of the peripheral edge of the flange being approximately .025". The radial width of the peripheral area under the flange outwardly of the concentric groove may be about 3/32" and the teeth may have a radial length of about .062" and may have a depth of about .011". As shown, the flange has twenty-four circumferentially spaced teeth. The concentric groove in the under side of the flange may be a right angle groove as illustrated; having a width at the surface of the flange of about 1/16". It is particularly significant to note that in the bolt, as shown in the drawings, the plane 22 through the annular bearing area 21 is below the plane 32 by a distance $$\left(\frac{d}{2}\right)$$

one-half the depth ($d$) of the teeth 31.

The foregoing dimensions will serve as a specific example but it will be understood that these dimensions may be varied for different sizes of bolts and nuts and also with the qualities and characteristics of the steel or metal from which they are made and still obtain certain advantages of the invention. Also, it will be understood that bolts (or nuts or screws) embodying the invention are formed from single piece blanks on standard cold forming machines, suitably modified. The bolts (or nuts or screws) are then hardened by carburizing, heat treatment or the like to insure higher quality in the finished product, such treatments being known in the art.

In a series of tests with a number of bolts constructed according to the bolt illustrated in the drawings (size 5/16"—24 x 1), the bolts were screwed home in a standard testing device, with an on torque of 240 inch pounds. The results of these tests were compared with tests using similar bolts but with the annular bearing surface surrounding the shank at different distances below the plane of the under side of the annular flange. The bolts embodying my invention in which the annular bearing area 21 was located in a plane 22 below the plane 32 by one-half the distance $$\left(\frac{d}{2}\right)$$

of the depth ($d$) of the teeth, had a thread tension of 3500 pounds at 240 inch pounds on torque and an off torque of 400 inch pounds. A similar bolt having the annular bearing surface flush with the bottom face of the flange had a thread tension of only 2000 pounds at 240 inch pounds on torque and an off torque of 450 inch pounds. A similar size bolt but having the annular bearing surface lowered to a depth ($d$) so that its plane was in the plane of the points 41a of the teeth 31, had a thread tension of 6700 pounds at an on torque of 240 inch pounds but its off torque was only 150 inch pounds, which is less than the on torque.

It may be seen from the foregoing that a bolt made according to my invention in which the bearing surface 21 lies in a plane below plane 32 one-half the distance $$\left(\frac{d}{2}\right)$$

of the depth ($d$) of the teeth 31 will have a materially higher thread tension for a given on torque than a bolt in which the bearing surface 21 lies flush or in plane 32 which is the same plane as the bottom surface 26 of the flange 16. And although the off torque is higher than the on torque, the thread tension of only 2000 pounds is materially less than the thread tension of my improved bolt and in addition to the materially higher thread tension of my bolt for the same one torque, the off torque is materially higher than the on torque so that the overall characteristics of my bolt are much preferable to prior art bolts of this type.

I have found that when the bearing surface 21 of a similar bolt of the same size was lowered to a depth more than six-tenths of the depth ($d$) of the teeth, that for an on torque of 240 inch pounds the thread tension was satisfactory, but the off torque dropped to 200 inch pounds which is considerably less than the on torque. And if the bearing surface 21 was raised so that it was in a plane a distance less than three-tenths of the depth ($d$) of the teeth, the on torque of 240 inch pounds produced a thread tension of only 2150 to 2000 pounds although the off torque was satisfactory. In other words, the critical range for producing a bolt having the desired high thread tension and higher off torque than on torque appears to be in a plane between three-tenths and six-tenths of the depth ($d$) of the teeth; the preferred location being in a plane approximately midway of the depth ($d$) of the teeth.

Similar results were obtained in a series of tests using different sizes of bolts. For example, hex bolts 3/8"—24 x 1 in which the annular bearing area was flush with the bottom of the flange for an on torque of 360 inch pounds had a thread tension of 2700–2800 pounds and an off torque of 600 inch pounds, whereas the same size bolt embodying my invention in which the bearing area was located in a plane below the bottom of the flange a distance equal to half the depth (d) of the teeth had a thread tension of 5000-5300 for the same on torque of 360 inch pounds and an off torque of 440 inch pounds.

Tests conducted by me have also shown that bolts made according to my invention will retain their desirable characteristics high thread tension and higher off torque than on torque after no less than five re-uses which establishes that these bolts are capable of re-use many times without losing their desired characteristics.

It will be understood also from the foregoing description that the invention is applicable to nuts and screws as well as to bolts. Whereas a bolt or screw has a stem extending from the head and the locking elements and features are embodied in the head; a nut, in place of having a stem, has a centrally bored threaded aperture to be screwed onto a threaded male member or stem and the locking elements and features are embodied in the nut. Such a nut, embodying the invention, is illustrated in Figs. 6 and 7 wherein is shown a nut having a head 11a corresponding generally to head 11 in Fig. 1 but having a centrally bored threaded aperture 24a. The nut has a flange 16a, having a flexible portion 25a, a rigid bearing surface area 21a in a plane 22a which is below the bottom face of the flange a distance of one-half the depth of the teeth 31a, a concentric groove 23a in the under face of the flange 16a, corresponding to the parts of the bolt designated by like reference numerals, without sub-letters.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A self-locking threaded fastener which comprises a head shaped to accommodate a driving tool, threaded means for screwing said fastener into fastening engagement with another member, an annular flange extending laterally from the lower portion of said head, the upper wall of said flange being inclined downwardly from the axis of said head so that the flange is thicker at its inner end than at its periphery, a rigid annular surface area under said head surrounding said threaded means and lying in a plane at right angles to the axis of said head and providing a rigid annular flat bearing surface, an annular groove in the undersurface of said flange surrounding said annular rigid bearing surface providing flexibility to the outer annular peripheral end portion of said flange, an outer annular face portion on the under side of said outer peripheral flange portion surrounding said groove and lying in a plane higher than said rigid annular bearing surface, a circular row of circumferentially spaced sharp cornered locking teeth extending downwardly from said outer annular face portion between said groove and the peripheral edge of said flange, said annular bearing surface lying in a plane within approximately three-tenths and approximately six-tenths of the distance between a plane through said outer annular surface of said flange and a plane through the outer ends of said teeth, said locking teeth frictionally engaging and biting into the member with which said fastener is screwed into engagement and said rigid bearing surface engaging said member and said outer peripheral flange portion being flexed upwardly in a direction away from said member and placed under tension when said fastener is screwed home into engagement with said member.

2. A self-locking bolt or screw which comprises a head shaped to accommodae a driving tool, a threaded shank extending downwardly from the bottom end of said head, an annular flange extending laterally from the lower portion of said head, the upper wall of said flange being inclined in a direction downwardly from the axis of said head so that the flange is thicker at its inner end than at its periphery, a rigid annular surface under said head surrounding said shank and lying in a plane at right angles to the axis of said shank and providing a rigid annular flat bearing surface, an annular groove in the under surface of said flange surrounding said annular rigid bearing surface providing flexibility to the outer annular peripheral end portion of said flange, an outer annular face portion on the under side of said outer peripheral flange portion surrounding said groove and lying in a plane higher than said rigid annular bearing surface, a circular row of circumferentially spaced sharp cornered locking teeth extending downwardly from said outer annular face portion between said groove and the peripheral edge of said flange, said annular bearing surface lying in a plane within approximately three-tenths to approximately six-tenths of the depth of said teeth measured from said outer annular face portion toward the crests of said teeth, said locking teeth frictionally engaging and biting into a part into which said bolt is screwed and said rigid bearing surface engaging said part and said outer peripheral flange portion being flexed upwardly in a direction away from said part and placed under tension when the bolt is screwed home in said part under a given "on" torque, said teeth providing locking means requiring a higher "off" torque to loosen the bolt after it is screwed home than said "on" torque to screw the bolt home.

3. A self-locking nut which comprises a head shaped to accommodate a driving tool, a threaded bore extending axially through said head, said nut being adapted to be screwed onto a male element to engage another member, an annular flange extending laterally from the lower portion of said head, the upper wall of said flange being inclined in a direction downwardly from the axis of said head so that the flange is thicker at its inner end than at its periphery, a rigid annular surface area under said head surrounding said bore and lying in a plane at right angles to the axis of said bore and providing a rigid annular flat bearing surface, an annular groove in the under surface of said flange surrounding said annular rigid bearing surface providing flexibility to the outer annular peripheral end portion of said flange, an outer annular face portion on the under side of said peripheral flange portion surrounding said groove and lying in a plane higher than said rigid annular bearing surface, a circular row of circumferentially spaced sharp cornered locking teeth extending downwardly from said outer annular face portion between said groove and the peripheral edge of said flange, said annular bearing surface lying in a plane within approximtely three-tenths to approximtely six-tenths of the depth of said teeth measured from said outer annular face portion toward the crests of said teeth, said locking teeth frictionally engaging and biting into said member when said nut is screwed home in engagement with said member under a given "on" torque, said rigid bearing surface engaging said member and said outer peripheral flange portion being flexed upwardly in a direction away from said member and placed under tension when said nut is screwed home in engagement with said member under said given "on" torque, said teeth providing locking means requiring a higher "off" torque to loosen said nut after it is screwed home than said "on" torque to screw the nut home.

4. A self-locking bolt or screw which comprises a head shaped to accommodate a driving tool, a threaded shank extending downwardly from the bottom end of said head, an annular flange extending laterally from the lower portion of said head, the upper wall of said flange being inclined downwardly from the axis of said head so that the flange is thicker at its inner end than at its periphery, a rigid annular surface area under said head surrounding said shank and lying in a plane at right angles to the axis of said shank and providing a rigid annular flat bearing surface, an annular groove in the under surface of said flange surrounding said annular rigid bearing surface providing flexibility to the outer annular peripheral end portion of said flange, an outer annular face portion on the under side of said outer peripheral flange portion surrounding said groove and lying in a plane higher than said rigid annular bearing surface, a circular row of circumferentially spaced sharp cornered locking teeth extending downwardly from said outer annular face portion between said groove and the peripheral edge of said flange, said annular bearing surface lying in a plane approximately midway between a plane through said outer annular surface of said flange and a plane through the outer ends of said teeth, said locking teeth frictionally engaging and biting into a part into which said bolt is screwed and said rigid bearing surface engaging said part and said outer peripheral flange portion being flexed upwardly away from said part and placed under tension when said bolt is screwed home in said part.

5. A self-locking nut which comprises a head shaped to accommodate a driving tool such as a wrench, a threaded bore extending axially through said head, said nut being adapted to be screwed onto a threaded male element to engage a first member and to clamp said first member to a second member, an annular flange extending laterally from the lower end of said head, the upper wall of said flange being inclined in a downward direction away from the axis of said bore so that the flange is thicker and more rigid at its inner end than at its outer end, a rigid annular surface area under said head surrounding said bore and lying in a plane at right angles to said axis and providing a rigid annular flat bearing surface, an annular groove in the under surface of said flange surrounding said annular rigid bearing surface providing flexibility to the outer annular peripheral end portion of said flange, an outer annular face portion on the under side of said outer peripheral flange portion surrounding said groove and lying in a plane above said rigid annular bearing surface, a row of circumferentially spaced sharp cornered locking teeth extending downwardly from said outer annular face portion between said groove and the peripheral edge of said flange, said annular bearing surface lying in a plane at right angles to the axis of the bore of said nut and approximately midway of the depth of said teeth, said locking teeth frictionally engaging and biting into said first member when said nut is screwed home on said male element and said outer peripheral flange portion being flexed and placed under tension when said nut is screwed home on said male element, said nut requiring a significantly higher "off" torque to loosen said nut after it has been screwed home to a given thread tension than the "on" torque to screw said nut home to said given thread tension.

References Cited in the file of this patent
UNITED STATES PATENTS

| | | |
|---|---|---|
| 963,042 | Gamon | July 5, 1910 |
| 1,049,590 | Mosher | Jan. 7, 1913 |
| 1,229,911 | Dodds | June 12, 1917 |
| 1,320,259 | Martens | Oct. 28, 1919 |
| 2,034,494 | Stoll | Mar. 17, 1936 |
| 2,253,241 | MacDonald | Aug. 19, 1941 |

UNITED STATES PATENT OFFICE

CERTIFICATE OF CORRECTION

Patent No. 2,959,204                                                               November 8, 1960

Robert M. Rigot

It is hereby certified that error appears in the printed specification of the above numbered patent requiring correction and that the said Letters Patent should read as corrected below.

Column 1, line 20, for "plane" read -- place --.

Signed and sealed this 25th day of April 1961.

(SEAL)
Attest:
ERNEST W. SWIDER
Attesting Officer

DAVID L. LADD
Commissioner of Patents